J. BEVIN.
Axle-Box.
No. 14,639.
Patented Apr. 8, 1856.
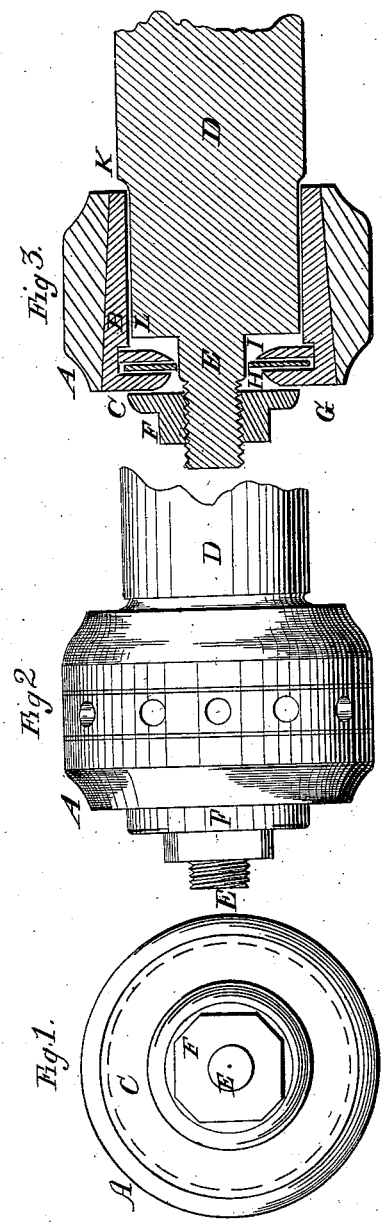

UNITED STATES PATENT OFFICE.

JULIUS BEVIN, OF UNADILLA FORKS, NEW YORK, ASSIGNOR TO HIMSELF AND SAML. N. STILLMAN.

BOX FOR AXLES.

Specification of Letters Patent No. 14,639, dated April 8, 1856.

*To all whom it may concern:*

Be it known that I, JULIUS BEVIN, of Unadilla Forks, in the county of Otsego and State of New York, have invented certain new and useful Improvements in Hub-Boxes for Carriage-Wheels; and I do hereby declare that the same are described and represented in the following specifications and drawings.

To enable others skilled in the art to make and use my improvements I will proceed to describe their construction and use referring to the drawings in which the same letters indicate like parts in each of the figures.

Figure 1 is an end elevation. Fig. 2 is a side elevation. Fig. 3 is a section representing it as cut through the center.

The nature of my invention and improvement consists in making a score or groove on the inside of the box, within or behind a flange which partially closes the end of the box, said score affording room for a washer to play within the flange, and it also receives a packing to prevent more effectually the escape of the lubricating matter, and exclude the dirt from the axle on which the box turns.

In the accompanying drawings A, is the hub usually made of wood in which the spokes of the wheel are inserted, but the hub and box may be of iron and cast together with holes in it for the spokes if preferred.

B, is the box with the hub around it provided with a flange C, at the outer end extending in toward the center, so as to partially close the end of the box and partially cover the end of the axle D, upon which the hub and box turns.

The end of the axle D, is reduced in size as represented at E, and provided with a screw nut F, which extends onto the flange C, (as shown in Fig. 3,) to hold the box on the axle and allow it to turn freely. There is a groove or score G, on the inside of the box B, just inside of the flange C, which is made so deep as to allow ample room for the washer H, and so wide as to afford sufficient room for the leather packing I which is made circular and quite as large in diameter as the score G and should be crowded in edgewise so as to fill the score except the space allowed to the washer, so as to turn with the box B, and allow the washer H to remain stationary or turn with the box whenever there is sufficient friction to carry it. The journal of the axle should be made so much shorter than the box that the end J, of the box will come against the shoulder K, before the shoulder L, reaches the packing I, so as to prevent the axle from ever disturbing the packing. Now if the packing is made to fit the score and the washer to fit the axle, it is believed that the flange, washer and packing will far more effectually prevent the escape of the lubricating matter applied to the axle, than any contrivance used prior to my invention, in which the end of the axle extended through the box, so that the box was fastened by a nut, or its equivalent on the end of the axle.

The box may be cast with a flange on, and a score in it without materially increasing its cost. Besides by using the flange a smaller and cheaper nut will answer equally as well as a large nut would without the flange.

I believe I have described the construction, operation, and use of my improvements so as to enable any person skilled in the art to make and use them; I will now specify what I desire to secure by Letters Patent to wit.

I am aware that hubboxes with a flange to partially close the hole in the end of the box, without a score behind it, have long been in common use; therefore I do not claim a box with a flange, without a score behind it; but,

I claim—

The new manufacture of hub box described for wheels which turn upon their axles to wit, a hub box with a score or groove on the inside of the box, within or behind a flange which partially closes the end of the box, said score affording room for the washer to play within the flange, and it also receives a packing to prevent more effectually the escape of the lubricating matter, and to exclude the dirt from the box and axle substantially as described.

JULIUS BEVIN.

Witnesses:
OSCAR W. WHITFORD,
A. J. WELLS.